United States Patent [19]
Gorsha

[11] 3,923,259
[45] Dec. 2, 1975

[54] SOIL EXTRACTOR FOR SOIL TESTING

[76] Inventor: Russell P. Gorsha, 4040 Fairview Drive, Toledo, Ohio 43612

[22] Filed: Mar. 28, 1974

[21] Appl. No.: 455,680

[52] U.S. Cl............ 241/278 R; 241/282.1; 269/287
[51] Int. Cl.[2]................................................. B02C 18/14
[58] Field of Search............. 241/101.4, 168, 169.1, 241/199.12, 277, 278 R, 282.1, 282.2; 269/287

[56] References Cited
UNITED STATES PATENTS

| | | | |
|---|---|---|---|
| 1,347,649 | 7/1920 | Mosher....................... | 241/277 UX |
| 2,068,013 | 1/1937 | Fridlender et al. ................ | 241/277 |
| 2,501,687 | 3/1950 | Moyer............................... | 241/278 |
| 3,865,320 | 2/1975 | Bowles........................... | 241/278 R |

FOREIGN PATENTS OR APPLICATIONS

| | | | |
|---|---|---|---|
| 398,289 | 7/1924 | Germany........................... | 241/277 |

Primary Examiner—Granville Y. Custer, Jr.
Assistant Examiner—Howard N. Goldberg
Attorney, Agent, or Firm—George R. Royer

[57] ABSTRACT

This invention is a device for expediting the extraction of soil from a container drum utilized for holding soil samples during various tests. The device is comprised of a horizontally disposed base platform member having on the upper surface thereof two fixed vertically disposed stanchion members on the one end thereof, and in addition, affixed on such upper surface is a vertically disposed holder for supporting vertically a tray member to which is attached the container drum holding the core sample. The vertically disposed stanchions serve as support means, and these support means are adapted to receive a longitudinally extending rotatable shaft, a portion of which is threaded over its surface. On the end of the shaft nearest the tray support member is a double headed cutting tool adapted and structured so as to cut into the soil sample to loosen it for removal.

3 Claims, 3 Drawing Figures

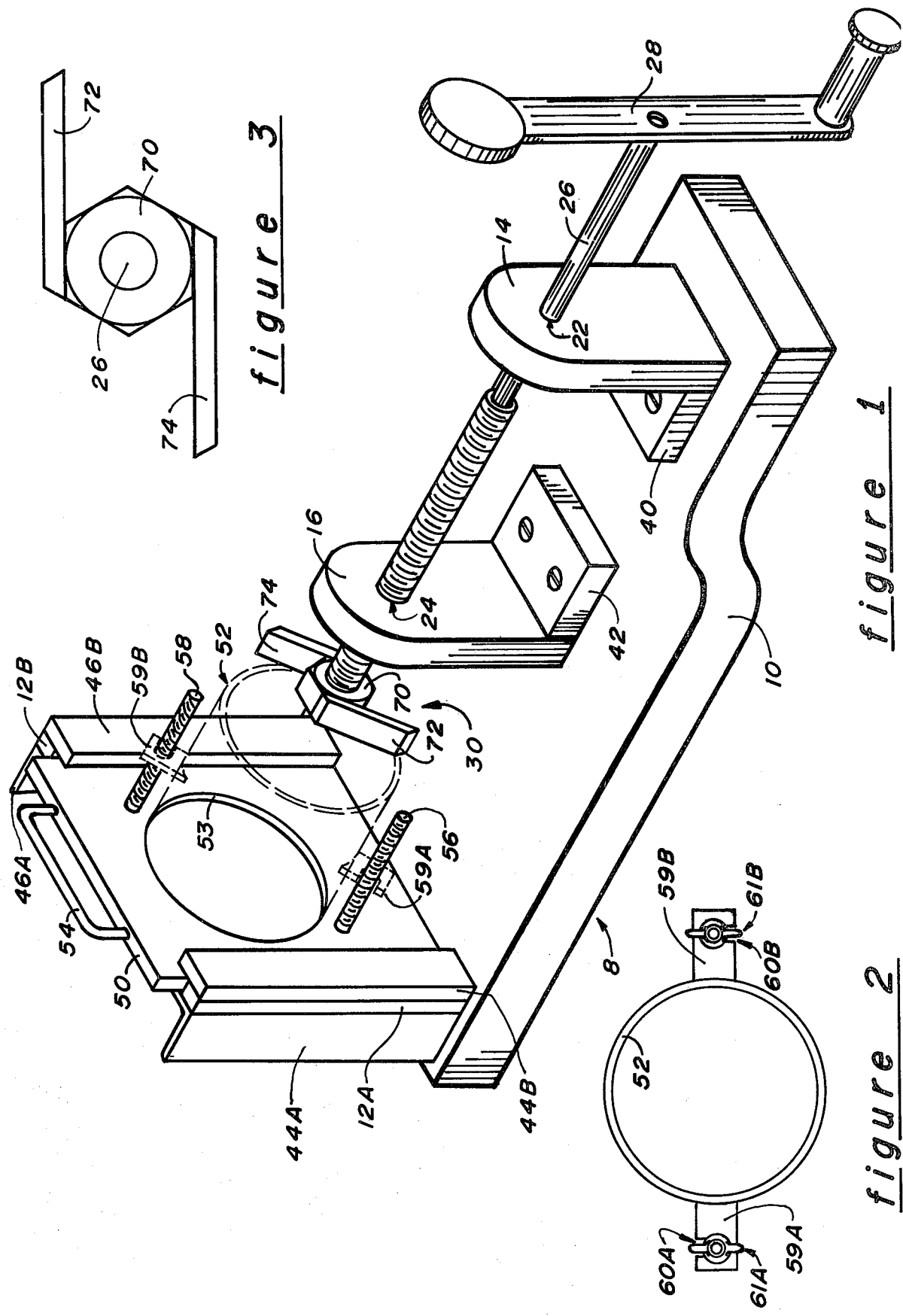

SOIL EXTRACTOR FOR SOIL TESTING

KNOWN PRIOR ART

Soil Pulverisor No. F545 manufactured by Test Lab, Inc. No other information is available on this structure.

BACKGROUND OF THE INVENTION

Soil testing has become an intricate and sophishcated art in the United States since with increased building activity in this country, more and more building construction is being done on marginal or submarginal soil. Therefore soil testing has become more significant in determining building structures, locations, type of building structures. Part of this soil testing process involves quite frequently the process of compacting the soil sample into a cylindrical drum container for various soil characteristic test, for example, a soil density determination test. This latter test involves ascertaining how much soil can be compacted into the container drum. Once the soil is so compacted and the test completed, it is then necessary to remove the compacted soil from the drum for further tests and to reuse the drum. Because in this test the soil is so substantially and tightly compacted, it is difficult to extract the soil contents by hand or other manual methods with any degree of facility. Even a chisel or other scraping tool is not ordinarily operationally efficient to remove the soil from the container drum. Valuable time is lost, consequently, in trying to extract the soil from the container drums after the one test, is completed. Therefore, automatic or semi-automatic methods become essential in the extraction process, if any degree of efficiency is to be achieved.

There are some inventions in the prior art which use a revolving blade on a rotating axis to enter into the compacted soil in the container drum to churn away at the soil sample and loosen it accordingly so that it can be drawn out. This latter type of extracting device is deficient in that the blade structure is not effective to remove the soil while it cuts into the soil mass. Additionally, in this only known extractor, the holder for the drum can only be used for a single drum and is not adaptable for various drum sizes and, therefore, does not have the necessary flexibility for testing various core sample sizes.

In view of the foregoing problems and deficiencies in the status of the prior art, it is an object of this invention to provide an improved device for extracting soil from a soil testing container;

another object of this invention is to provide an improved and more efficient process in soil testing;

yet another object of this invention is to provide an improved process for extracting soil samples from containers used in the soil testing process;

still another object of this invention is to provide an improved device for aiding in soil testing processes.

Other and further objects of the subject invention will become manifest from a reading of the following description taken in conjunction with the drawings:

FIG. 1 is an overall perspective view of a preferred embodiment of the subject invention. FIG. 2 is a top elevational view showing the mechanism for securing the drum to the tray member.

FIG. 3 is an end elevational view of the blade mechanism and cutting tool used in the subject invention.

DESCRIPTION OF GENERAL EMBODIMENT

The invention is a device for cutting into and removing compacted soil from a container drum, which drum is used to hold soil compactly for various soil testing processes. The device is comprised of a longitudinally extending base platform member which has on its upper surface two vertically extending stanchion members, spaced horizontally from one another. Each of these vertical stanchions has a circular opening at the upper part thereof extending through each stachion. A rotatable shaft member is disposed through these openings in the shaft members.

Affixed on that end of the rotatable shaft adjacent to the end of the platform is a conventional turning handle, while located on the other end is a twin-bladed cutting tool. A vertical slide arrangement is attached to the upper surface of the platform and is adapted to receive a drum containing soil therein. Located on the tray are means to securely hold a drum in place in a horizontal position.

DESCRIPTION OF THE PREFERRED EMBODIMENT

Reference will be made to the indicated drawings in the following description of the preferred embodiment of the subject invention. In describing this preferred embodiment, it is essential that the reader understand that other structural forms and modifications may be utilized in embodying the inventive principles set forth herein. and that the embodiment described is considered a preferred adaption of the invention.

Soil testing has become a relatively sophisticated and necessary science involving chemical analysis, physical tests, and other intricate and critical tests. It is frequently desirable, from a standpoint of efficiency, to use the same soil sample repeatedly for the various tests involved, where practicable. In some of the tests, it is necessary to compact the soil sample into a cylindrical container to such an extent that it becomes difficult to manually spatulate or extract the soil by a simple conventional manual tool. In such instances, certain specific machinery, whether automatically, semi-automatically, or manually operated, must be utilized to extract the compacted soil from the cylindrical container. This dependence on machinery becomes necessary if ordinary business and operational efficiencies are to be maintained; otherwise the test operator or some assistant will spend wasted hours removing soil from the container.

The subject invention is constructed to overcome these operating deficiencies and inefficiencies, and is basically a machine possessing a cutting tool appropriately stabilized and held so as to be easily advanced and retracted along a given axis for a range of horizontal distances. The horizontal distance that the cutting tool can be advanced or retracted along such horizontal and longitudinal axis is of a distance at least as long as the depth of the cylindrical drum containing the soil sample. This enables the advance of the cutting tool to reach completely through the depth of the soil sample, as the soil container drum is situated on its side in a horizontal posture, with open end of the drum exposed towards the cutting tool.

Referring now to FIG. 1, soil extractor 8 is comprised of a base platform member 10 having situated on one end thereof two matching vertical and recessed, slide members 12A and 12B, and a pair of vertical stanchions 14 and 16, one of which 14 is affixed to the end of the base platform opposite to that end holding the vertical slide members 12A and 12B. Stanchion 16 is located and affixed in the approximate middle of the base platform 10 as shown in FIG. 1. Each stanchion 14 and 16 has a circular opening 22 and 24 respectively positioned in the upper portion thereof. The opening 22 is smoothly finished with an appropriate bearing surface therein. Opening 24 is threaded in order to receive a mating threaded member. A rotatable shaft member 26 is inserted through openings 22 and 24 so as to lie horizontally through such openings as represented by FIG. 1. On the one end of rotatable shaft 26, which is adjacent to stanchion 16, is affixed a counterweighted handle member 28 for turning shaft 26 clockwise or counterclockwise as desired. Positioned on the opposite end of Shaft 26 is a two-bladed cutting tool 30. A sliding tray 50 structured to hold a cylindrical container 52, shown in phantom, is structured to slide vertically downwardly into the trackways provided by vertical slide members 12A and 12B.

More specifically, the soil extractor 8 is anchored on a horizontally disposed platform 10 in order that the extractor 8 may be appropriately stabilized when being used. Since the platform 10 is not permanently affixed to a table or other structure, the extractor 8 can be transported from place to place avoiding thereby the necessity of permanent attachments. The base platform 10 is shown as having a variable width; however, any configuration of the platform is feasible so long as the material used in its construction is a heavy metal or wood to ensure sufficient weight and stability. Specifically as shown in FIG. 1, the platform is relatively thick, with a width of three inches considered optimal, while the platform length may vary between two to three feet. These dimensions should not be viewed as delimiting, particularly when the base is comprised of metal.

The vertical stanchion 14 and 16 located on base platform 10 are comprised of a wooden or metallic substance. Stanchions 14 and 16 are of such height so as to enable openings 22 and 24 to carry the central axis of the shaft 26 at a sufficient height to reach the central longitudinal axis of the cylindrical drum container as horizontally positioned and shown in FIG. 1. The circular opening 22 located in stanchion 14 has a diameter only slightly larger than the diameter of shaft 26. This circular opening 22 is provided with an appropriate bearing surface around its inner peripheral surface so as to accommodate shaft 26 and reduce the friction of the rotational movement of the shaft. Vertically disposed stanchion 16 is of similar constructional arrangement to stanchion 14; however, stanchion 16 is located and affixed in the approximate middle of base member 10, as represented in FIG. 1. Additionally, opening 24 is threaded to receive in mating fashion a threaded portion of shaft member 26. Although not critical to the construction of the invention, the stanchions 14 and 16 have rounded upper portions and the bottom portions thereof are anchored to horizontally disposed bases 40 and 42 respectively, as seen in FIG. 1.

Vertical slide members 12A and 12B are constructed with some suitable metallic substance, such as stainless steel, which can readily withstand wear. The slide 12A is braced and held in place by parallel and abutting vertical support members 44A and 44B. These brace members 44A and 44B, as well as the slide member 12A are permanently anchored to the base member 10 as represented. In similar fashion, slide 12B is braced by vertical support members 46A and 46B as shown, and these latter members are structured and anchored in a manner similar to vertical support members 44A and 44B. Thus, vertical slide members 12A and 12B as constructed are recessed between the respective vertical support members so as to form vertical trackways.

A holding tray member 50 is provided for insertion vertically downwardly in the trackways formed by slides 12A and 12B as shown in FIG. 1. The function of tray member 50 is to hold a cylindrical container 52, as shown in phantom in FIG. 1, in a stationary horizontal position with the open end of the container 52 facing towards stanchion 16. In order to accomplish this latter purpose, holding tray 50 is constructed as follows: tray 50 is basically comprised of a substantially square shaped metallic member, the width of which is fractionally less than the distance between vertical length of each of the slide members 12A and 12B; although this latter dimensional characteristic is not critical in the construction of the invention. The one side of the tray member 50 has a handle member 54, and in the normal usage the handle member 54 will be uppermost when tray 50 is introduced between the slide 12A and 12B as shown in FIG. 1. On the surface of the tray 50 is recessed a circular depression 52 just slightly larger than the diameter of the container 52 so that the cylindrical container 52 can snugly rest therein while being held by tray 50 either in a vertical or horizontal position. Two post members 56 and 58 which are vertically disposed whenever tray member 50 is situated in a horizontal position are located on the same surface as circular depression 53, and disposed from one another in diagonally opposed positions. More specifically, post 56 is located in one corner of tray 50 while post 58 is located in a diagonally opposite corner although the relative positions are not critical. These vertical posts 56 and 58 are threaded throughout their entire length as shown. Further, posts 56 and 58 serve a functional relationship as hereinafter described.

Cylindrical container 52 is of convention shape and construction for containing molds in the soil industry, and for optimal handling and wear, a metallic container is generally used. On the lower extermity of container 52 are two horizontally portruding dog members 59A and 59B which have semicircular indentations therein as shown. These two protruding dog members 59A and 59B are diametrically opposed on the cylindrical container and are integrally attached to the cylindrical container by suitable means. Dog members 59A and 59B have semicircular, indentations 60A and 60B respectively therein as shown in FIG. 2, the function of which will be described as follows.

The cylindrical container 52 is secured to tray 50 in the following manner. First the bottom of cylindrical container 52 is inserted in depression 53. Then the protruding dog members 59A and 59B are juxtaposed adjacent to vertical post members 56 and 58. The indentations 60A and 60B of members 59A and 59B respectively are engaged against the adjacent periphery of the vertical posts 56 and 58, then wing nuts 61A and 61B are threaded downwardly on posts 56 and 58, respectively and tightly clasped against the upper surfaces of protruding dog members 59A and 59B to lock thereby the container 52 to tray 50.

Thus positioned and anchored, container 52 is fixed firmly relative to tray 50 while container 52 is in a vertical position, with its open end upright and filled with a compacted soil sample. Tray 50 is then lifted by a 90 degree turning movement so that it is disposed vertically upright and the container's longitudinal vertical axis becomes horizontal. In this latter bertical positional relationship the tray 50 is lifted and inserted vertically down between the trackways of vertical slides 12A and 12B into the position shown in FIG. 1. In this position, as explained before, the container 52 is horizontally stabilized relative to base member 10 as shown in FIG. 1, with its open end facing directly towards cutting tool member 30 and stanchion 16.

Rotatable shaft member 26 as shown in FIG. 1, is threaded with a conventional inclined pitch over substantially one-third of its length, as represented in FIG. 1. Opening 24 in stanchion 16 is threaded to accommodate the threaded portion of shaft 26 so that when the shaft 26 is turned in the appropriate clockwise or counterclockwise it will be advanced towards container 52 or retracted along its horizontal longitudinal axis accordingly.

Located on the one end of shaft 26 is a cutting tool 30. Cutting tool 30 is comprised of a hexagonally shaped central core member 70 which is semipermanently fitted on the end of shaft member 26, so that the core member 70 and thus the cutting tool 30 rotate as a single unit with shaft 26. Integrally attached to core member 70 are two cutting blades 72 and 74 both of which are rectangular in shape. As shown in FIGS. 1 and 3, each blade 72 and 74 has a beleved knife on its longer edge, which edges are directed towards the container 52 when positioned as shown. Each blade 72 and 74 is attached to the core member 70 in such a manner that one of its two larger rectangular surfaces is tangentially affixed to one of the circumferentially dispaced hexagonal surfaces. of the core member 72 as shown. The surface of each blade 72 and 74 which is tangentially affixed and nearest to the central axis of core member 70 extends on each side of the central axis of core 70, as seen in FIG. 3, so as to overlap one another when viewed relative to a diameter extending from the core central axis to the point of tangency. Stated differently, the ends of each blade 72 and 74 which are innermost in the cutting tool do not terminate a point which is the exact tangential point of contact between the respective blade and the outer periphery of core member 70 but rather such ends extend beyond these tangential points by approximately 4 to 5 centimeters as seen in FIG. 3. By this constructional arrangement both blades 72 and 74 extend in tangential directions in the same clockwise or counterclockwise manner, but in opposite directions when viewed from center of core. By this construction the blade member 30 is given unique cutting advantages in a soil extractor device of this type.

The extractor device 8 is operated as follows: The tray 50 with the soil-filled container 52 is placed vertically downwardly between the vertical slides 12A and 12B as shown to position container 52 horizontally in front of tool 30. The operator then turns handle 28 on shaft 26 so as to advance shaft 26 and thus cutting tool 30 into the open end of the container 52 holding the soil sample. The tool 30 cuts into the soil sample serving both in loosening the soil and extracting it outwardly by a stoker-like effect created by the tool 30.

When the tool 30 has been completely advanced into the container 52 it is then retracted to pull out any remaining soil which soil is expelled by the reverse motion of shaft 26.

In view of the slide arrangement created by vertical slides 12A and 12B in conjunction with a sliding tray arrangement containers of various sizes can be used in extractor device 8. Specifically, a tray of similar dimensions such as tray 50 can be constructed to have cylindrical containers of various sizes, particularly diameters of various sizes, fitted and affixed thereon for use in extractor 8. This is thus one important feature of device 8, namely that different trays can be placed between the slides 12A and 12B, and thus containers of different sizes can be placed in the extractor 8 for the soil extracting process.

The foregoing description is for purposes only of illustrating a preferred embodiment and should not be construed to limit the scope of the following claims.

What is claimed is:

1. A soil extracting device for removing soil from a soil container comprising in combination:
   a. a horizontially disposed base platform member;
   b. vertical slide and support means affixed to the upper surface of said base platform member;
   c. a removable rectangularly shaped tray member which is positioned on the soil extracting device between the vertical slide members in a vertically upright position;
   d. fastening means on said tray member to securely hold the soil container in a horizontial position on said tray member when the tray member is vertically upright between the vertical slide and support means;
   e. vertical disposed support means located on the upper surface of the said base platform member, said vertical support means adopted to carry a shaft member at some height above the upper surface the base platform member which is sufficient to reach the center of the soil container;
   f. a horizontally disposed rotatable shaft member carried by said vertical support means at a height above the top surface of the base platform member such that the central longitudinal axis of the shaft member reaches the center of the soil container when disposed in a horizontal position;
   g. rotatable cutting means located on the end of the rotable shaft member which is adjacent to the vertical slide members, said cutting tool, said cutting means adapted to cut into any soil in the container to remove the soil upon rotation of rotatable shaft.

2. An extracting device for removing soil from a soil container comprising in combination;
   a. a horizontally disposed base platform member;
   b. vertical and supportive means affixed to the upper surface of said base platform member;
   c. a removable rectangularly shaped tray member which is positioned on the soil extracting device in the vertical slide and support means in a vertically upright position;
   d. fastening means located on said tray member to securely hold the soil container in a horizontal position when said tray member is vertically upright;
   e. vertically disposed support members located on the upper surface of the said base platform member, said vertical support means adapted to carry a shaft member at some height above the upper surface of the base platform member which is sufficient to reach the center of the container;

f. a horizontally disposed and threaded rotatable shaft member carried by said vertical support means at a height sufficient to reach the center of the soil container when the tray is vertically upright;

g. turning means on said shaft member for rotating the shaft and thereby advancing or retracting the shaft upon clockwise or counterclockwise shaft revolutions;

h. rotatable cutting means located on the end of the rotatable shaft member which is adjacent to the vertical slide members, said cutting tool, said cutting means adapted to cut into any soil in the container and remove same upon rotation of rotatable shaft.

3. An extracting device for removing soil from a soil container comprising in combination:

a. a horizontal base member;

b. two vertically disposed and supportive slide members affixed to the upper surface of said platform member to receive various parallrlopiped shaped members;

c. a removable parallelopiped shaped tray member which is positioned on the extracting device between the two vertical slide members in a vertically upright position;

d. fastening means located on said tray member to securely hold the soil in a horizontal position when said tray member is vertically upright.

e. vertically disposed support members located on the upper surface of the said base platform member, said vertical support means adapted to carry a shaft member at some height above the upper surface of the base platform member which is sufficient to reach the center of the container;

f. a horizontally disposed and threaded shaft member carried by said vertical support means at a height sufficient to reach the center of the soil container when in a horizontal position;

g. a cutting tool having two rectangular blades located on the end of the rotatable shaft member which is adjacent to the vertical slide members, said cutting tool adapted to cut into any soil in a container and remove same upon rotation of rotatable shaft and a retraction thereof.

* * * * *